J. KOWALSKY.
CRANK FOR BENCH DRILLS.
APPLICATION FILED AUG. 7, 1915.

1,190,559.

Patented July 11, 1916.

WITNESSES
M. R. McInnis
E. A. Paul

INVENTOR
JOHN KOWALSKY
BY Paul & Paul
ATTORNEYS

UNITED STATES PATENT OFFICE.

JOHN KOWALSKY, OF MINNEOTA, MINNESOTA.

CRANK FOR BENCH-DRILLS.

1,190,559.     Specification of Letters Patent.     Patented July 11, 1916.

Application filed August 7, 1915. Serial No. 44,312.

*To all whom it may concern:*

Be it known that I, JOHN KOWALSKY, a citizen of the United States, resident of Minneota, county of Lyon, State of Minnesota, have invented certain new and useful Improvements in Cranks for Bench-Drills, of which the following is a specification.

In the operation of a bench drill or similar tool, the crank is usually mounted to slide in its support to enable the operator to increase or decrease the leverage on the drill spindle.

The object of my invention is to provide a sliding crank arm of this kind equipped with means for locking it securely in any of its adjusted positions without the necessity of the operator removing his hand from the work.

A further object is to provide a locking means for the operating crank of simple construction and one which will securely clamp the arm while the tool is being operated.

The invention consists generally in various constructions and combinations, all as hereinafter described and particularly pointed out in the claims.

Figure 1:
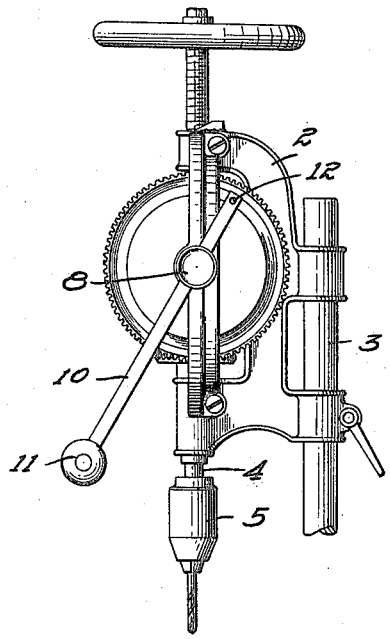
Figure 2:
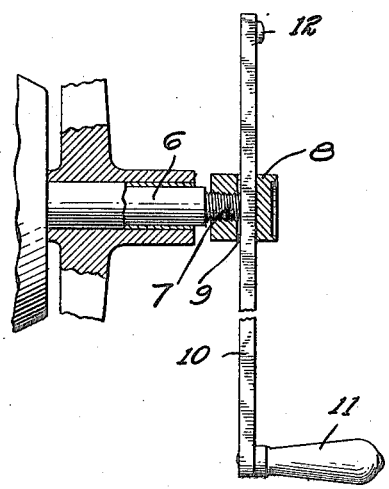

In the accompanying drawings forming part of this specification, Figure 1 is an elevation of a bench drill embodying my invention, Fig. 2 is a detail sectional view, illustrating my improved means for clamping the operating crank.

In the drawing, 2 represents a drill carried by a suitable standard 3 and provided with a spindle 4 and tool holder 5.

6 is a shaft through which power is transmitted to operate the spindle. The outer end of this shaft is threaded, as indicated at 7.

8 is a nut that is tapped at one end to receive the threaded end 7 and a slot 9 extends transversely through the nut, intersecting the threaded opening therein and adapted to receive a crank arm 10 which is preferably flat and has a handle 11 at one end and a stop 12 at the other end. This slot 9 is of sufficient depth to allow the arm 10 to slide freely therein except when it is engaged by the threaded end 7 and locked securely against longitudinal movement. Evidently by turning this crank in one direction, the nut 8 will be moved outward on the threaded spindle and the arm 10 released, and said arm may then be moved lengthwise in the slot to the desired position for operating the shaft. As soon as this adjustment has been obtained, reverse movement of the nut 8 will cause the end of the shaft to enter the slot and contact with the face of the arm 10, clamping it securely against the opposite wall of the slot and preventing longitudinal movement of the arm until such time as the nut 8 is revolved in the opposite direction. I am thus able to provide a quick, convenient means for adjusting the crank arm to regulate its leverage on the shaft without the necessity of using both hands and without losing any time in the operation of the machine.

I claim as my invention:

1. The combination, with a shaft having a threaded end, of a nut having a slot extending therethrough from side to side and into one end of which nut said shaft is tapped to intersect said slot, a crank arm having flat faces and slidable lengthwise in said slot, the outer wall of said slot forming a broad bearing surface for said arm and against which surface said arm is pressed when said nut is revolved in one direction to engage said shaft with the opposite surface of said arm, said arm being released and free to slide lengthwise in said slot when said nut is revolved in the opposite direction.

2. The combination, with a shaft having a threaded end, of a nut into which said threaded end is tapped, said nut having a transverse slot therein, a crank arm slidable in said slot and locked by engagement with said threaded end when said nut is revolved in one direction, and released when it is revolved in the other direction.

In witness whereof, I have hereunto set my hand July 24 1915.

JOHN KOWALSKY.

Copies of this patent may be obtained for five cents each, by addressing the "Commissioner of Patents, Washington, D. C."